US012766434B2

(12) United States Patent
Miyata

(10) Patent No.: US 12,766,434 B2
(45) Date of Patent: Oct. 20, 2026

(54) SOLVENT VAPOR SUPPLY APPARATUS AND SOLVENT VAPOR SUPPLY METHOD

(71) Applicant: Tokyo Electron Limited, Tokyo (JP)

(72) Inventor: Yuichiro Miyata, Koshi City (JP)

(73) Assignee: Tokyo Electron Limited, Tokyo (JP)

( * ) Notice: Subject to any disclaimer, the term of this patent is extended or adjusted under 35 U.S.C. 154(b) by 934 days.

(21) Appl. No.: 18/060,040

(22) Filed: Nov. 30, 2022

(65) Prior Publication Data

US 2023/0173403 A1 Jun. 8, 2023

(30) Foreign Application Priority Data

Dec. 8, 2021 (JP) ................................ 2021-199047

(51) Int. Cl.
*B01D 5/00* (2006.01)

(52) U.S. Cl.
CPC ......... *B01D 5/0054* (2013.01); *B01D 5/0051* (2013.01); *B01D 5/006* (2013.01); *B01D 5/0093* (2013.01)

(58) Field of Classification Search
CPC ... B01D 5/0054; B01D 5/0051; B01D 5/0093
USPC ........................................................... 34/471
See application file for complete search history.

(56) References Cited

U.S. PATENT DOCUMENTS

2009/0232977 A1* 9/2009 Morinaga .................. C08J 7/02 15/302
2012/0034369 A1* 2/2012 Ito ............................ G03F 7/16 118/712
2014/0273290 A1* 9/2014 Somervell ............. B82Y 10/00 34/90
2016/0293403 A1* 10/2016 Muramatsu ....... H01L 21/67115
2019/0375158 A1* 12/2019 Crabtree ............. B29C 71/0009

FOREIGN PATENT DOCUMENTS

JP 2013-249430 A 12/2013

* cited by examiner

*Primary Examiner* — Connor J Tremarche
(74) *Attorney, Agent, or Firm* — Posz Law Group, PLC

(57) ABSTRACT

A solvent vapor supply apparatus is for supplying solvent vapor to a substrate treatment. The solvent vapor supply apparatus includes a solvent storage which is kept warm at a temperature equal to or higher than a saturation temperature of a solvent stored therein; a precooler which precools the solvent vapor generated in the solvent storage; and a temperature regulator which regulates a temperature of the precooled solvent vapor to a target temperature when the solvent vapor is supplied to the substrate treatment apparatus. The temperature regulator supplies the solvent vapor regulated to the target temperature to the substrate treatment apparatus.

15 Claims, 6 Drawing Sheets

SOLVENT VAPOR SUPPLY APPARATUS AND SOLVENT VAPOR SUPPLY METHOD

CROSS REFERENCE TO RELATED APPLICATIONS

This application is based upon and claims the benefit of priority of the prior Japanese Patent Application No. 2021-199047, filed in Japan on Dec. 8, 2021, the entire contents of which are incorporated herein by reference.

TECHNICAL FIELD

This disclosure relates to a solvent vapor supply apparatus and a solvent vapor supply method.

BACKGROUND

Japanese Laid-open Patent Publication No. 2013-249430 discloses a pattern forming method including the steps of forming a film of a block copolymer containing at least two polymers on a substrate, heating the film of the block copolymer under a solvent vapor atmosphere to phase-separate the block copolymer, and removing one of the polymers of the film of the phase-separated block copolymer.

SUMMARY

One aspect of this disclosure is a solvent vapor supply apparatus for supplying solvent vapor to a substrate treatment apparatus, the solvent vapor supply apparatus including: a solvent storage configured to be kept warm at a temperature equal to or higher than a saturation temperature of a solvent stored therein; a precooler configured to precool the solvent vapor generated in the solvent storage; and a temperature regulator configured to regulate a temperature of the precooled solvent vapor to a target temperature when the solvent vapor is supplied to the substrate treatment apparatus, wherein the temperature regulator is configured to supply the solvent vapor regulated to the target temperature to the substrate treatment apparatus.

DETAILED DESCRIPTION

Figure 1:
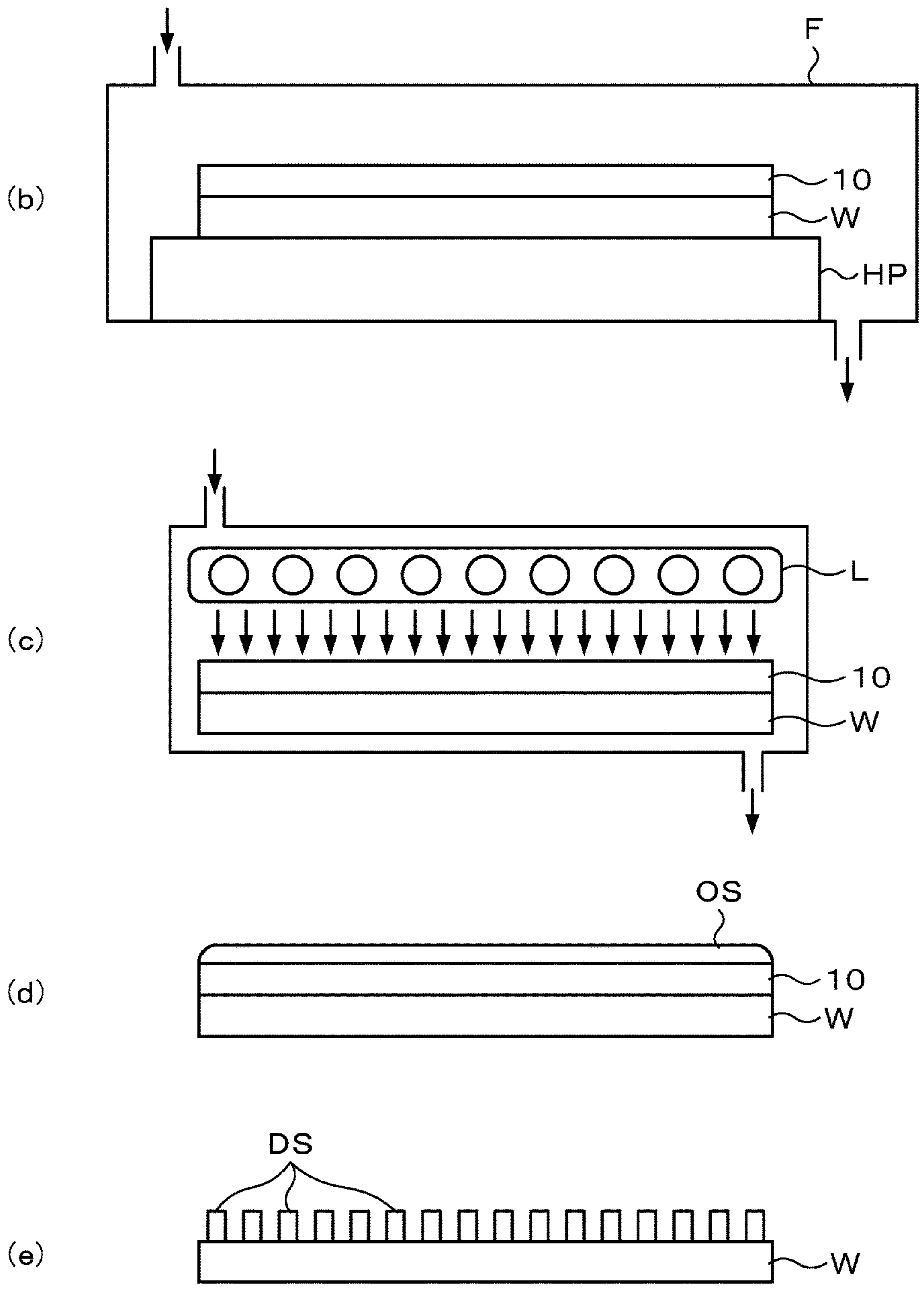
FIG. 1 is an explanatory view for explaining a pattern forming method according to this embodiment.

In a manufacturing process of a semiconductor device or the like, there is a known method for forming a desired pattern on a semiconductor wafer (hereinafter, referred to as a "wafer") using a directed self-assembly (DSA) lithography technique.

In this method, first, a coating solution of a block copolymer containing, for example, an A polymer chain and a B polymer chain is applied to the wafer to form a thin film of the block copolymer on the wafer. Then, the wafer is heated to phase-separate the A polymer chain and the B polymer chain which randomly form a solid solution in the thin film. Then, ultraviolet light is applied to the wafer to form a soluble region and a hardly soluble region with respect to an organic solvent. Thereafter, an organic solvent is supplied to the wafer to dissolve the soluble region. This forms a desired pattern on the wafer.

In the step of phase-separating the block copolymer in the above pattern forming method, vapor of the solvent (hereinafter, referred to as "solvent vapor") controlled to predetermined temperature and concentration is supplied to a heating apparatus in which the wafer is housed. This solvent vapor is generated, for example, by heating a tank storing the solvent to vaporize the solvent.

Incidentally, the temperature of the solvent in the tank decreases by vaporization heat when generating the solvent vapor from the solvent in the tank, and therefore the temperature and concentration of the solvent vapor to be supplied from the tank to the heating apparatus are likely to vary. Therefore, to stabilize the solvent vapor to be supplied to the heating apparatus at predetermined temperature and concentration, it is necessary to perform a control of following the variation in solvent temperature in the tank due to the vaporization heat to thereby perform regulation of the solvent temperature, or temperature regulation or concentration regulation of the solvent vapor.

However, in a method for regulating the solvent temperature in the tank, for example, by a temperature control of the tank, responsiveness of the temperature change of the solvent to the temperature control of the tank is low because the thermal efficiency of the tank is low. For this reason, there is room for improvement in a viewpoint of stabilizing the temperature and concentration of the solvent vapor to be supplied to the heating apparatus. Besides, there also is a conceivable control method for directly heating the solvent in the tank instead of temperature-controlling the tank temperature, but a mechanism for securing the chemical resistance and safety with respect to the solvent is necessary, possibly leading to complication and increase in price of the configuration of the solvent vapor supply apparatus. Besides, there also is a conceivable control method for regulating the concentration of the solvent vapor, for example, by pressure control in the tank, but a supply apparatus capable of the pressure control is possibly complicated and increased in price.

Hence, a technique according to this disclosure stabilizes the temperature and concentration of a solvent vapor to be supplied to a substrate treatment apparatus by a solvent vapor supply apparatus with an inexpensive configuration.

Hereinafter, a pattern forming method, a substrate treatment apparatus, and a solvent vapor supply apparatus according to this embodiment will be explained in order with reference to the drawings. Note that the same reference numerals are given to components having substantially the same functional configurations in the this description and the drawings to omit duplicate description.

Pattern Forming Method

FIG. 1 is an explanatory view for explaining a pattern forming method according to this embodiment.

First, as illustrated in FIG. 1(*a*), a coating solution made by dissolving a block copolymer (PS-b-PMMA) of polystyrene (PS) and polymethyl methacrylate (PMMA) in an organic solvent is applied onto a wafer W as a substrate to form a film 10 of PS-b-PMMA on the wafer W. In this film 10, a PS polymer as a first polymer and a PMMA polymer as a second polymer are randomly mixed with each other.

Next, as illustrated in FIG. 1(*b*), the wafer W on which the film 10 of PS-b-PMMA is formed is transferred into a heating apparatus F as a substrate treatment apparatus, and the wafer W is mounted on a hot plate HP. Then, a solvent vapor is supplied from an upper wall portion of the heating apparatus F to heat the wafer W to a predetermined temperature under a solvent vapor atmosphere. This causes a phase separation of the film 10 of the block copolymer on the wafer W, so that a PS polymer region and a PMMA polymer region are alternately arrayed. Note that in order to array the PS polymer region and the PMMA polymer region in a predetermined pattern, it is preferable to form a guide pattern on the surface of the wafer W.

The solvent in the coating solution in which PS-b-PMMA is dissolved is not particularly limited as long as it can dissolve the PS polymer and the PMMA polymer and, for example, toluene, acetone, ethanol, methanol, and cyclohexanon can be used. Besides, the temperature of the film 10 during the heating is preferably higher than a glass transition temperature of PS-b-PMMA and may be, for example, a temperature of 150 to 350° C.

After the wafer W is heated for a predetermined time, the supply of the solvent vapor into the heating apparatus F is stopped. Then, in order to dry the film 10, the film 10 of PS-b-PMMA is further heated under an atmosphere of an inert gas (a nitrogen gas, or a rare gas such as argon gas or helium gas). This makes the solvent (and solvating medium) in the film 10 evaporate. Note that the temperature of the film 10 during the drying is preferably lower than the glass transition temperature so as to prevent the PS polymer and the PMMA polymer from flowing during the drying.

Next, as illustrated in FIG. 1(*c*), ultraviolet light is applied to the film 10 of PS-b-PMMA on the wafer W. The application of the ultraviolet light is performed under an atmosphere of an inert gas such as a rare gas of argon (Ar) or helium (He) or a nitrogen gas. The ultraviolet light is not particularly limited as long as it has a wavelength component belonging to an ultraviolet light region, but preferably has a wavelength component of, for example, 200 nm or less. Further, the ultraviolet light further preferably contains a wavelength component of 185 nm or less that can be absorbed by PMMA. In the case of using the ultraviolet light having a wavelength component with a wavelength of 200 nm or less, an Xe excimer lamp emitting ultraviolet light with a wavelength of 172 nm can be preferably used as a light source L.

When the film 10 of PS-b-PMMA is irradiated with the ultraviolet light, the PS polymer region becomes difficult to dissolve in the organic solvent because a crosslinking reaction occurs in the PS polymer region, whereas the PMMA polymer region becomes easy to dissolve in the organic solvent because the main chain is cut in the PMMA polymer region. Note that in the case of using the ultraviolet light with a wavelength of 172 nm, its irradiation intensity (dose amount) is preferably about 180 mJ or less. In the case where the irradiation intensity of the ultraviolet light is 180 mJ or less, the organic solvent becomes difficult to permeate the PS polymer region at the time of supply of the organic solvent to the later-explained film 10 of PS-b-PMMA. As a result, swelling of the PS polymer region is suppressed, making it easier to remove the PMMA polymer region. Further, in the case where the irradiation intensity of the ultraviolet light is 180 mJ or less, the change in quality of the PMMA polymer region can be suppressed, making it easier to dissolve the PMMA polymer region in the organic solvent.

Next, as illustrated in FIG. 1(*d*), an organic solvent OS is supplied to the film 10 of PS-b-PMMA. This causes the PMMA polymer region in the film 10 to dissolve and the PS polymer region to remain on the surface of the wafer W. As the organic solvent OS, for example, isopropyl alcohol (IPA) can be preferably used.

Thereafter, when the surface of the wafer W is dried, a pattern composed of PS polymer regions DS is obtained on the surface of the wafer W as illustrated in FIG. 1(*e*).

According to the above pattern forming method, the heating of the film 10 of PS-b-PMMA is performed under the solvent vapor atmosphere, so that the solvent can be absorbed in the film 10 during the heating. Therefore, even if a solvating medium existing in the film 10 evaporates during the heating, the decrease in concentration with respect to the solvating medium and the solvent in the PS polymer and the PMMA polymer in the film 10 is suppressed by the absorbed solvent. This maintains the fluidity of the PS polymer and the PMMA polymer, and thereby can promote the fluidization of PS-b-PMMA and promote the phase separation.

Note that PS-b-PMMA is exemplified as the block copolymer in this embodiment, but the block copolymer is not limited to this. The block copolymer may be, for example, polybutadiene-polydimethylsiloxane, polybutadiene-4-vinylpyridine, polybutadiene-methylmethacrylate, polybutadiene-poly-t-butylmethacrylate, polybutadiene-t-butylacrylate, poly-t-butylmethacrylate-poly-4-vinylpyridine, polyethylene-polymethylmethacrylate, poly-t-butylmethacrylate-poly-2-vinylpyridine, polyethylene-poly-2-vinylpyridine, polyethylene-poly-4-vinylpyridine, polyisoprene-poly-2-vinylpyridine, polymethylmethacrylate-polystyrene, poly-t-butylmethacrylate-polystyrene, polymethylacrylate-polystyrene, polybutadiene-polystyrene, polyisoprene-polystyrene, polystyrene-poly-2-vinylpyridine, polystyrene-poly-4-vinylpyridine, polystyrene-polydimethylsiloxane, polystyrene-poly-N,N-dimethylacrylamide, polybutadiene-sodium polyacrylate, polybutadiene-polyethyleneoxide, poly-t-butylmethacrylate-polyethyleneoxide, polystyrene-polyacrylic acid, polystyrene-polymethacrylic acid, polystyrene-polydimethylsiloxane (PS-b-PDMS), or the like.

Configuration of a Substrate Treatment Apparatus

Figure 2:
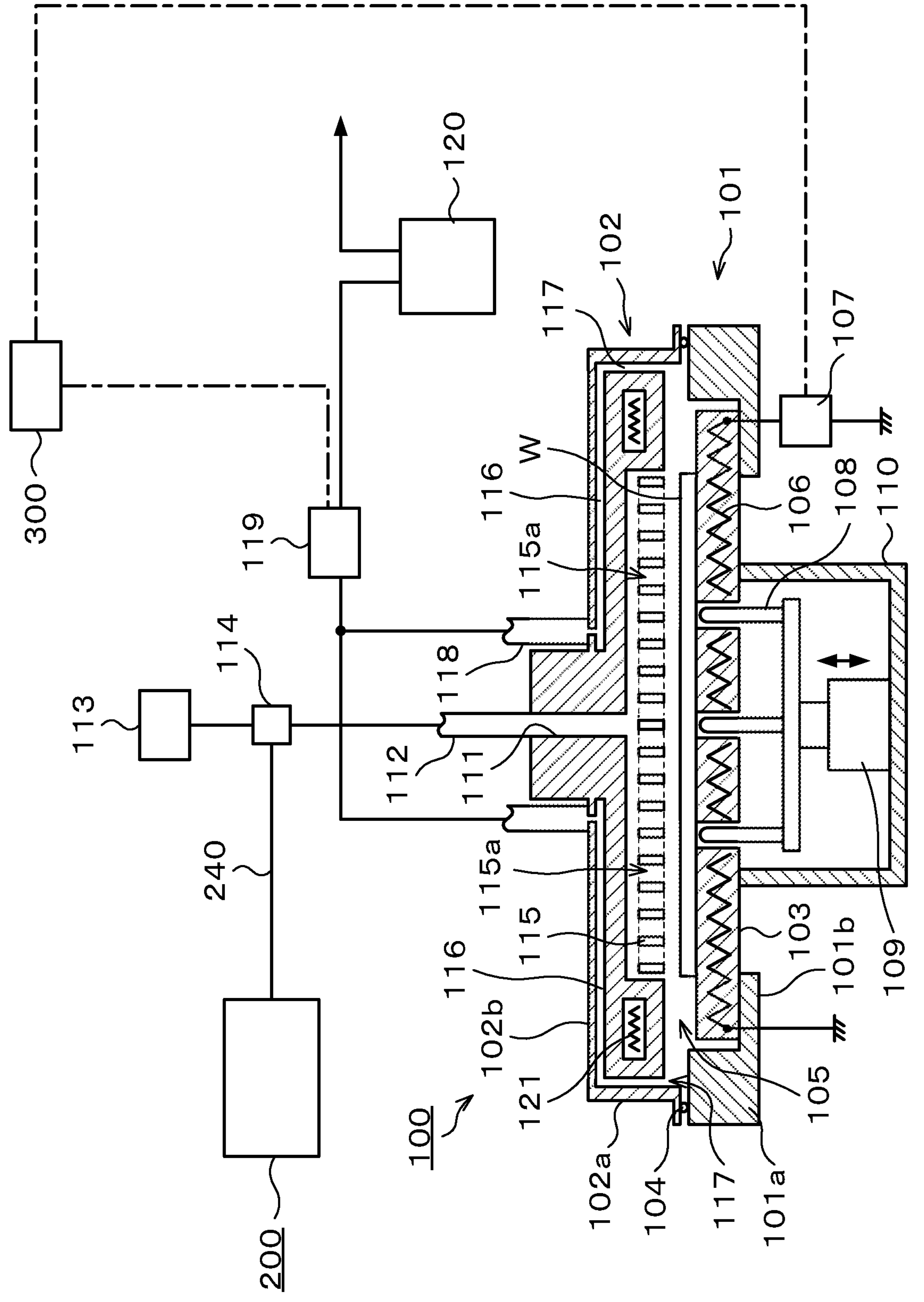
FIG. 2 is an explanatory view illustrating the outline of a configuration of a heating apparatus according to this embodiment.

Next, a heating apparatus as one example of the substrate treatment apparatus which implements the above pattern formation will be explained. FIG. 2 is an explanatory view schematically illustrating the outline of a configuration of the heating apparatus according to this embodiment.

A heating apparatus 100 includes a container body 101 in a cylindrical shape having an upper end opening and a bottom portion, and a lid 102 covering the upper end opening of the container body 101. The container body 101 includes a frame 101*a* having an annular ring shape, a bottom part 101*b* in a flange shape extending inward from a bottom portion of the frame 101*a*, and a stage 103 supported on the bottom part 101*b* and holding the wafer W thereon.

Between an upper surface of the frame 101*a* of the container body 101 and a peripheral edge 102*a* of the lid 102, a seal member 104 such as an O-ring is provided. This demarcates a treatment chamber 105 between the container body 101 and the lid 102.

Inside the stage 103, a heating part 106 is provided, and a power supply 107 is connected to the heating part 106. The stage 103 is heated by the heating part 106 and a thermoregulator (not illustrated), and the wafer W mounted on the stage 103 is also heated.

At the stage 103, a plurality of raising and lowering pins 108 are provided for delivering the wafer W to/from an external transfer means (not illustrated). These raising and lowering pins 108 are configured to be raised and lowered by a raising and lowering mechanism 109. On a rear surface of the stage 103, a cover 110 is provided which surrounds the periphery of the raising and lowering mechanism 109. The container body 101 and the lid 102 are configured to freely relatively rise and lower. In the example illustrated in FIG. 2, the lid 102 freely rises and lowers between a treatment position where the lid 102 is connected to the container body 101 and a wafer transfer in/out position where the lid 102 is positioned on the upper side of the container body 101 by a not-illustrated raising and lowering mechanism.

A gas supply path 111 for supplying gas containing the solvent vapor to the wafer W mounted on the stage 103 penetrates the middle of the lid 102. A pipe 112 is connected to the gas supply path 111, and a nitrogen gas supply source 113 which purges the treatment chamber 105 is connected to the pipe 112. This can supply a nitrogen gas as a purge gas to the treatment chamber 105. Further, the pipe 112 is provided with a three-way valve 114, and a steam supply pipe 240 of a later-explained solvent vapor supply apparatus 200 is connected to the three-way valve 114.

Below a lower end of the gas supply path 111, a current regulating plate 115 is arranged. The current regulating plate 115 is formed with a plurality of slits (or openings) 115*a*. The plurality of slits 115*a* are formed so as to cause a large pressure difference between a space on an upper side and a space on a lower side of the current regulating plate 115. Therefore, the solvent vapor supplied to the treatment chamber 105 through the gas supply path 111 spreads in the lateral direction on the upper side of the current regulating plate 115 and flows toward the wafer W through the slits 115*a*. Accordingly, the solvent vapor is supplied to the wafer W at an almost uniform concentration.

Further, inside an upper wall part 102*b* of the lid 102, a flat hollow part 116 having, for example, a ring-shaped flat planner shape, that is, spreading in a planar shape in a region other than a central region where the gas supply path 111 is formed. To the hollow part 116, an exhaust path 117 is coupled which extends in the vertical direction on the outer peripheral side of the lid 102 and outside the stage 103 and opens to the treatment chamber 105. Further, to the hollow part 116, a plurality of (for example, six) exhaust pipes 118 are connected, for example, at the central portion of the lid 102. The exhaust pipes 118 are connected to an ejector 119, and the ejector 119 is connected to a trap tank 120. A heater 121 is provided inside the lid 102 at a position between the exhaust path 117 and the current regulating plate 115, and heats the lid 102 to a predetermined temperature. This suppresses condensation (liquefaction) of the solvent vapor supplied to the lid 102.

The heating apparatus 100 includes a controller 300. The controller 300 is a computer including, for example, a CPU, a memory, and so on, and has a program storage (not illustrated). The program storage stores various programs for controlling the treatment of phase-separating the block copolymer in the heating apparatus 100. For example, the controller 300 outputs a command signal to parts or members of the power supply 107 and the ejector 119 based on the programs to control the power to be supplied from the power supply 107 to the heating part 106, the exhaust rate of gas including the solvent vapor to be exhausted from the treatment chamber 105 by the ejector 119, and so on. Note that the above programs may be the ones which have been stored in a computer-readable program storage medium and are installed from the storage medium into the controller 300. The storage medium may be a transitory storage medium or a non-transitory storage medium. Some or all of the programs may be implemented by dedicated hardware (circuit board).

Figure 3:
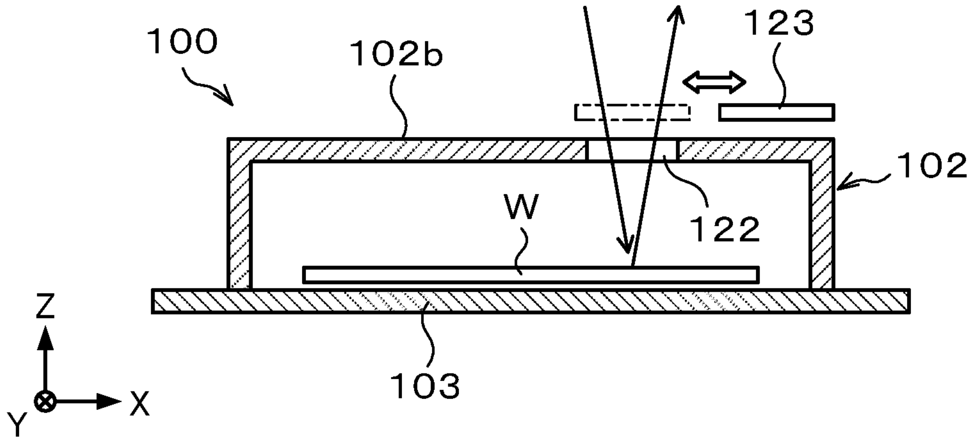
FIG. 3 is an explanatory view for explaining an opening/closing mechanism for a transmission window of the heating apparatus.

Further, in the heating apparatus 100, the thickness of the film of the block copolymer on the wafer W is measured using, for example, an ellipsometer as an In-situ thickness-meter. Therefore, as illustrated in FIG. 3, the upper wall part 102*b* of the lid 102 of the heating apparatus 100 is provided with a transmission window 122 which transmits ultraviolet light applied from the ellipsometer (not illustrated) and reflected light reflected on the wafer W. Above the transmission window 122, a light-blocking plate 123 covering the transmission window 122 is provided. The light-blocking plate 123 is configured to be movable in an X-axis direction by a moving mechanism (not illustrated) and movable between a position where the light-blocking plate 123 covers the transmission window 122 and a position where the light-blocking plate 123 does not cover the transmission window 122.

In the case of applying the ultraviolet light to the wafer W for film thickness measurement, if the ultraviolet light is continuously applied to a fixed region of the wafer W, the film may change in quality, resulting in difficulty in measuring the film thickness. On the other hand, in the heating apparatus 100 illustrated in FIG. 3, the light-blocking plate 123 can cover the transmission window 122 while the film thickness is not measured, and the light-blocking plate 123 can be moved to the position where the light-blocking plate 123 does not cover the transmission window 122 to open a portion above the transmission window 122 while the film thickness is measured. In other words, the heating apparatus 100 illustrated in FIG. 3 can suppress the change in quality of the film because the ultraviolet light is applied to the wafer W only during a time necessary for the film thickness measurement. Note that from the viewpoint of suppressing the change in quality of the film, in place of the opening/closing mechanism for the transmission window 122 by the light-blocking plate 123 as illustrated in FIG. 3, for example, a mechanism of rotating the wafer W may be provided, or a mechanism of moving the wafer W in the X-axis direction or a Y-axis direction may be provided. Further, the opening/closing mechanism for the transmission window 122 and both the rotation and moving mechanisms may be provided so that the number of times of measurement at the same position can be arbitrarily set.

Configuration of a Solvent Vapor Supply Apparatus

Figure 4:
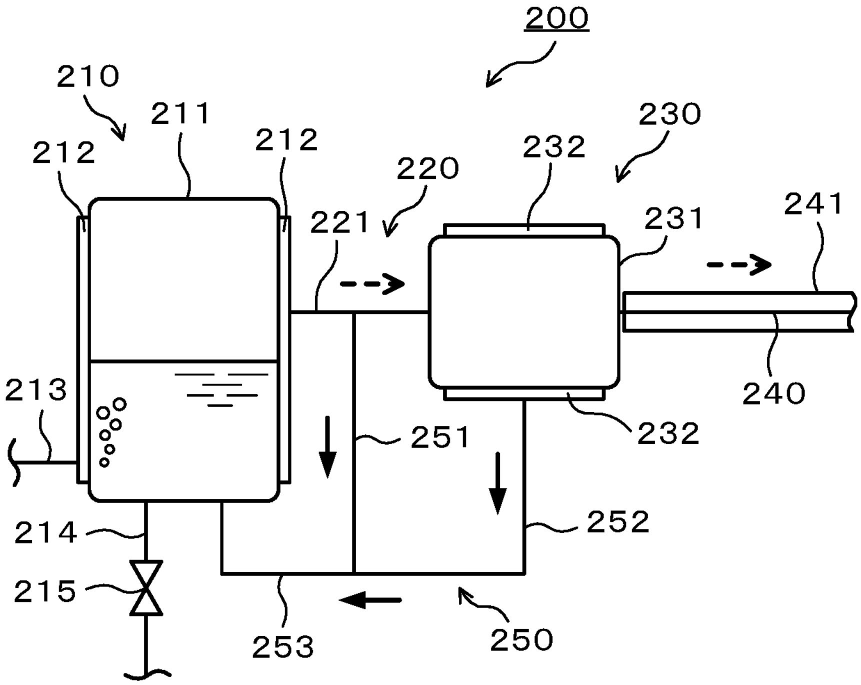
FIG. 4 is an explanatory view illustrating the outline of a configuration of a solvent vapor supply apparatus according to this embodiment.

Next, a solvent vapor supply apparatus 200 which supplies the solvent vapor to the heating apparatus 100 will be explained. FIG. 4 is an explanatory view schematically illustrating the outline of a configuration of the solvent vapor supply apparatus according to this embodiment. Note that broken arrows in the drawing indicate the flow of the solvent vapor, and solid arrows indicate the flow of the solvent generated by condensation (liquefaction) of part of the solvent vapor. Besides, a piping structure in the drawing is schematically illustrated for convenience of explanation, and a piping structure such as a connection position of each pipe is appropriately configured by the skilled in the art for realizing the functions explained below.

Configuration Example 1

A solvent vapor supply apparatus 200 illustrated in FIG. 4 includes a solvent storage 210, a precooler 220, and a temperature regulator 230.

The solvent storage 210 has a tank 211 (hereinafter, referred to as a "first tank") which stores a solvent therein, and a heating part 212 which heats the first tank 211.

The heating part 212 is not particularly limited as long as it can heat the solvent in the first tank 211 and, for example, a heating means using a heater can be applied. The first tank 211 is heated by the heating part 212 to a temperature equal to or higher than a saturation temperature of the solvent stored in the first tank 211. This vaporizes the solvent in the first tank 211 to generate the solvent vapor. Note that a concrete temperature of the first tank 211 is appropriately changed according to the material and size of the first tank 211, the pressure in the first tank 211 or the like, and is a temperature of, for example, 40° C. or higher.

When the solvent vapor is generated in the first tank 211, the heat of the solvent stored in the first tank 211 is absorbed by vaporization heat, and the first tank 211 is continuously heated to be the temperature equal to or higher than the saturation temperature of the solvent. Therefore, the first tank 211 is kept warm at the temperature equal to or higher than the saturation temperature of the solvent. Note that the temperature of the solvent vapor is regulated to a target temperature by the later-explained temperature regulator 230 so that if the solvent vapor can be generated in the first tank 211, no strict temperature control in the solvent storage 210 is necessary.

To the first tank 211, a nitrogen gas supply pipe 213 which supplies a nitrogen gas to the solvent stored in the first tank 211 is connected. During the heating of the first tank 211, bubbling of the solvent is performed by supplying the nitrogen gas to the first tank 211 so as to uniform the temperature and concentration of the solvent. Note that the gas to be supplied for the bubbling is not limited to the nitrogen gas, but may be another inert gas such as an argon gas or a helium gas.

To the bottom surface of the first tank 211, a drain pipe 214 is connected, the drain pipe 214 is provided with a valve 215. The valve 215 is periodically opened to discharge impurities accumulated at the bottom portion of the first tank 211, whereby the cleanliness of the first tank 211 is maintained.

The first tank 211 is provided with a liquid level sensor (not illustrated) for the solvent stored therein, so that when the liquid level of the solvent becomes less than a predetermined height, the solvent is automatically supplied to the first tank 211 from a solvent supply source (not illustrated).

The precooler 220 in the example of FIG. 4 is a pipe 221 serving as a flow path for the solvent vapor, and the pipe 221 is connected to the first tank 211 and a later-explained second tank 231. The pipe 221 is not covered with an heat insulating material, but is exposed to the ambient atmosphere. Since the temperature of the ambient atmosphere around the pipe 221 is lower than the temperature of the first tank 211, the solvent vapor generated in the first tank 211 decreases in temperature by passing through the pipe 221.

The solvent vapor is cooled in the pipe 221 to a temperature higher by several degrees Celsius than the target temperature of the solvent vapor to be supplied to the heating apparatus 100. In other words, the solvent vapor generated in the first tank 211 is precooled before being temperature-regulated in the later-explained second tank 231. Note that the length and diameter of the pipe 221 are appropriately changed according to the set temperature of the first tank 211 and the ability to regulate the temperature of the solvent vapor in the later-explained temperature regulator 230.

The temperature regulator 230 in the example of FIG. 4 has the second tank 231 into which the solvent vapor precooled in the pipe 221, and a cooling part 232 which cools the second tank 231.

As the cooling part 232, a concrete cooling means is not particularly limited as long as it can cool the solvent in the second tank 231 and, for example, a cooling means using a Peltier element can be applied. The second tank 231 is cooled by the cooling part 232 so that the temperature of the solvent vapor supplied into the second tank 231 becomes the target temperature when the solvent vapor is supplied to the heating apparatus 100.

Since the "concentration" of the solvent vapor correlates to the "temperature" of the solvent vapor, the temperature when the solvent vapor becomes a desired concentration can be specified by acquiring in advance the correlation between the concentration and temperature of the solvent vapor in the case of using the solvent vapor supply apparatus 200 by an experiment or the like. In other words, the solvent vapor with a target concentration can be supplied to the heating apparatus 100 by regulating the temperature of the solvent vapor to a target temperature corresponding to the target concentration of the solvent vapor. In the temperature regulator 230, the concentration of the solvent vapor becomes the target concentration when the solvent vapor is supplied to the heating apparatus 100 by cooling the solvent vapor to the target temperature.

The solvent and the solvent vapor exist in a mixed manner in first tank 211 in the above-explained solvent storage 210, so that even if the temperature of the first tank 211 is controlled, the responsiveness of the temperature change of the solvent vapor to the temperature control is low, and therefore it is difficult to stabilize the temperature of the solvent vapor at a fixed temperature. On the other hand, no solvent is stored in the second tank 231 in the temperature regulator 230, so that the responsiveness of the temperature change of the solvent vapor to the temperature control of the second tank 231 is high, and therefore it is easy to stabilize the temperature of the solvent vapor at a fixed temperature. In short, the generation and the temperature regulation of the solvent vapor are performed in different containers, thereby making it possible to enhance the responsiveness of the solvent vapor to the temperature control and making it easier to regulate the temperature of the solvent vapor to the target temperature.

Further, from the viewpoint of enhancing the responsiveness of the solvent vapor to the temperature control in the temperature regulator 230, it is preferable that the volume capacity of the second tank 231 is smaller than the volume capacity of the first tank 211.

Note that though the cooling part 232 is provided to cool the solvent vapor in the second tank 231 in this embodiment, a heating part (not illustrated) which heats the second tank 231 may be provide in addition to the cooling part 232. In the case where the solvent vapor becomes lower than the target temperature, the second tank 231 may be heated by the heating part.

To the second tank 231, the steam supply pipe 240 for supplying the solvent vapor to the heating apparatus 100 is connected, so that the solvent vapor temperature regulated to the target temperature in the second tank 231 is supplied to the heating apparatus 100 via the steam supply pipe 240. The steam supply pipe 240 is covered with a heat insulating material 241 so as to prevent the change of the temperature of the solvent vapor.

The solvent vapor supply apparatus 200 includes a solution sending mechanism 250 which sends a solvent generated by condensation (liquefaction) of part of the cooled solvent vapor to the first tank 211. The solution sending mechanism 250 has a pipe 251 connected to the pipe 221, a pipe 252 connected to the second tank 231, and a merging pipe 253 where the solvent in the pipe 251 and the solvent in the pipe 252 merge. The merging pipe 253 is connected to the first tank 211.

The provision of the solution sending mechanism 250 makes it possible to recover and reuse the solvent generated by the condensation of the solvent vapor. Note that the configuration of the solution sending mechanism 250 is not limited to the configuration explained in this embodiment, but only needs to be a configuration which can send the solvent generated by condensation of part of the solvent vapor generated in the solvent storage 210 into the first tank 211.

The configuration of the solvent vapor supply apparatus 200 is explained above, and other configuration examples of the solvent vapor supply apparatus 200 will be explained in the following explanation. Note that in the following explanation of the configuration examples, duplicated explanations will be omitted for the same configurations as those in the configuration example illustrated in FIG. 4.

Configuration Example 2

Figure 5:
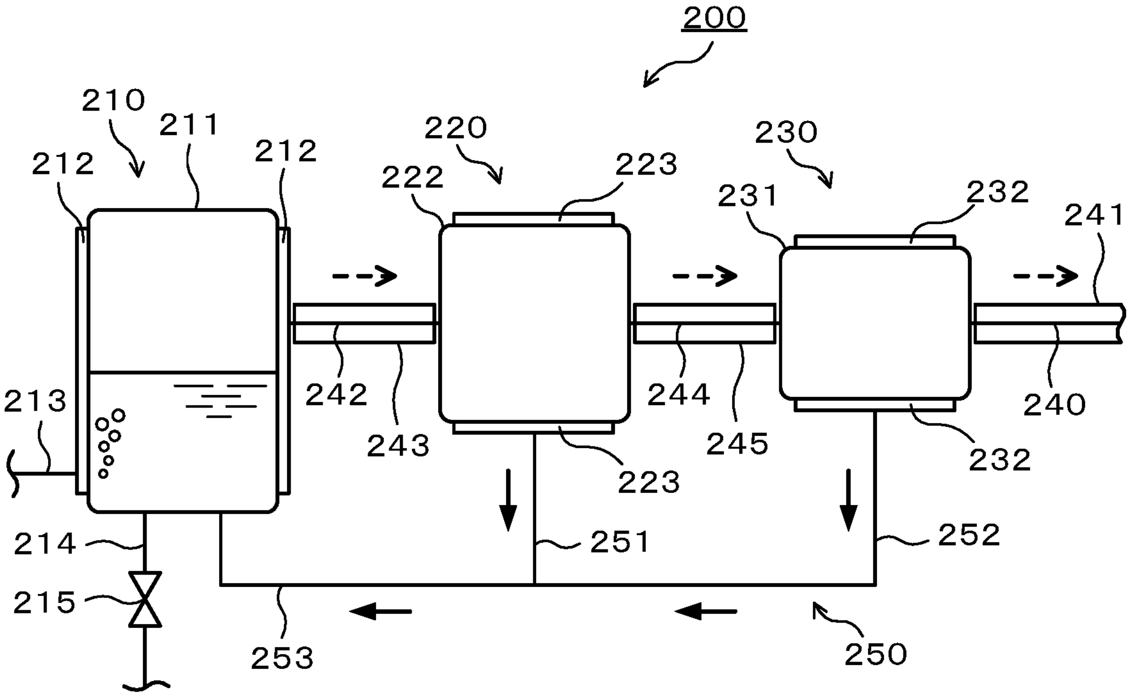
FIG. 5 is an explanatory view illustrating another configuration example of the solvent vapor supply apparatus.

In a solvent vapor supply apparatus 200 illustrated in FIG. 5, the precooler 220 includes a third tank 222, and a cooling part 223 which cools the third tank 222.

The third tank 222 is a container into which the solvent vapor generated in the first tank 211 flows and which is arranged between the first tank 211 and the second tank 231. As the cooling part 223, a concrete cooling means is not particularly limited as long as it can cool the solvent in the third tank 222 and, for example, a cooling means using a Peltier element can be applied. The third tank 222 is cooled by the cooling part 223 so that the temperature of the solvent vapor supplied into the third tank 222 decreases down to near the target temperature when the solvent vapor is supplied to the heating apparatus 100.

The first tank 211 and the third tank 222 are connected by a pipe 242, and the periphery of the pipe 242 is covered with a heat insulating material 243. Besides, the third tank 222 and the second tank 231 are connected by a pipe 244, and the pipe 244 is covered with a heat insulating material 245. Note that this piping structure may be configured such that, for example, the remaining heat of the first tank 211 is taken into between the pipe 242 and the heat insulating material 243 and between the pipe 244 and the heat insulating material 245 so as to prevent condensation of the solvent vapor in the pipe 242 and the pipe 244.

In the solvent vapor supply apparatus 200 configured as above, the solvent vapor is sent in the order of the first tank 211, the third tank 222, and the second tank 231. Further, the solvent vapor generated in the first tank 211 is precooled in the third tank 222, and the temperature of the solvent vapor is cooled down to near the target temperature in the precooling. In other words, before the temperature of the solvent vapor is regulated to the target temperature in the temperature regulator 230, the temperature of the solvent vapor is regulated to near the target temperature in the precooler 220. Thus, only fine regulation of the temperature of the solvent vapor in the temperature regulator 230 can set the temperature of the solvent vapor to the target temperature.

Note that from the viewpoint of enhancing the responsiveness of the solvent vapor to the temperature control, it is preferable that the volume capacity of the third tank 222 is smaller than the volume capacity of the first tank 211 and the volume capacity of the second tank 231 is smaller than the volume capacity of the third tank 222.

Configuration Example 3

Figure 6:
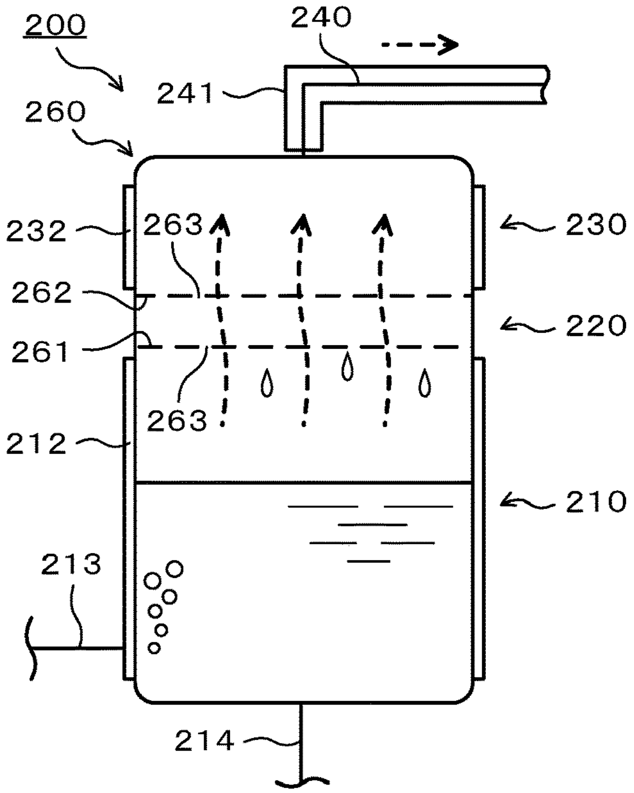
FIG. 6 is an explanatory view illustrating another configuration example of the solvent vapor supply apparatus.

In a solvent vapor supply apparatus 200 illustrated in FIG. 6, the solvent storage 210, the precooler 220, and the temperature regulator 230 are integrated and provided in one container 260. In the container 260, the precooler 220 is arranged above the solvent storage 210 and the temperature regulator 230 is arranged above the precooler 220.

Inside the container 260, two plates 261, 262 are arranged at an interval in a height direction of the container 260, and the solvent storage 210, the precooler 220, and the temperature regulator 230 are partitioned by these plates 261, 262. In more detail, the plate 261 is arranged between the solvent storage 210 and the precooler 220, and the plate 262 is arranged between the precooler 220 and the temperature regulator 230. Note that the size of each of regions of the solvent storage 210, the precooler 220, and the temperature regulator 230 in the height direction of the container 260 is appropriately changed according to the size of the container 260, the heating ability of the heating part 212, the cooling ability of the cooling part 232, or the like.

The plate 261, 262 is provided with a plurality of openings 263 through which the solvent vapor can pass. The solvent vapor generated in the solvent storage 210 passes through the precooler 220 and the temperature regulator 230 via the openings 263 and is thereby supplied to the steam supply pipe 240. Note that the plate 261, 262 is one example of a partition wall which partitions the inside of the container 260 and, for example, punched metal can be used. Here, as the punched metal, the one with a resin coating applied on its surface may be used. Besides, the plate 261, 262 is not limited to the one formed of a metal material but may be the one formed of resin.

In the precooler 220, temperature regulation mechanisms such as the heating part 212 of the solvent storage 210 and the cooling part 232 of the temperature regulator 230 are not provided on the side surface of the container 260, and the precooler 220 is therefore exposed to the atmosphere around the container 260. Therefore, the solvent vapor generated in the solvent storage 210 is precooled by passing through the precooler 220. Thereafter, the precooled solvent vapor is cooled down to the target temperature in the temperature regulator 230.

In the case where part of the solvent vapor is condensed (liquefied) by the precooler 220 and the temperature regulator 230, the solvent generated by the condensation adheres to the inner surface of the container 260 and the plates 261, 262. These solvents drop to the solvent storage 210 by their own weights and reused.

Note that a cooling means in the precooler 220 is not particularly limited, but a cooling part (not illustrated) such as the cooling part 232 may be provided. Besides, a heat insulating material (not illustrated) may be arranged, for example, at the precooler 220 in a manner not to inhibit the flow of the solvent vapor to thereby prevent transfer of the remaining heat of the solvent storage 210 to the precooler 220 and the temperature regulator 230.

Figure 7:
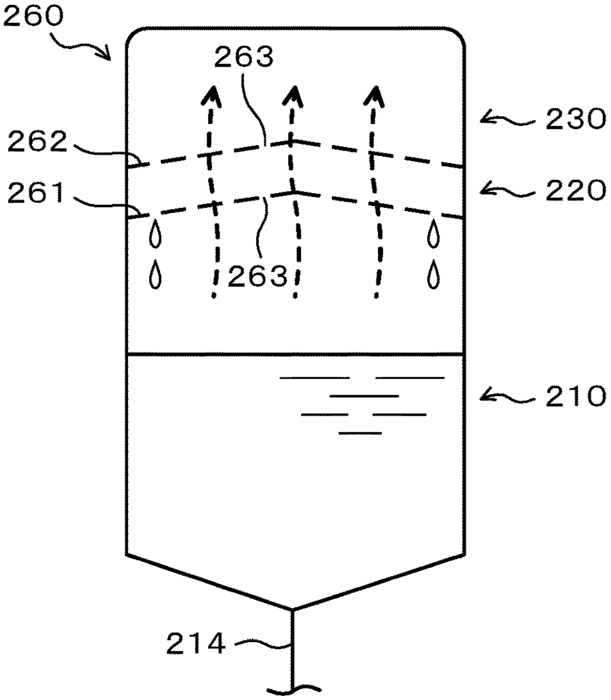
FIG. 7 is an explanatory view illustrating another configuration example of the solvent vapor supply apparatus.

Besides, as illustrated in FIG. 7, the bottom surface of the container 260 may be formed in a tapered shape in which a center portion projects downward, and the drain pipe 214 may be connected to a lower end of the bottom surface in the tapered shape. Thus, when impurities are generated in the solvent storage 210, the impurities gather at the lower end of the container 260, so that the impurities are easily removed at the time of discharging the solvent from the drain pipe 214. The bottom surface in the tapered shape may be applied to the bottom surface of the above-explained first tank 211.

Besides, the plate 261, 262 may be formed in a tapered shape in which a center portion projects upward. When the plate 261, 262 has the shape, droplets of the solvent generated by the condensation of the solvent vapor easily flow down toward a peripheral edge portion of the plate 261, 262. Thus, a plurality of droplets gather into large droplets, and easily drop by their own weights. In short, the condensed solvent becomes easily recovered. Further, such clogging that the droplets of the solvent cover the openings 263 of the plate 261, 262 becomes less likely to occur, thereby stabilizing the flow rate of the solvent vapor from the solvent storage 210 to the temperature regulator 230.

Configuration Example 4

Figure 8:
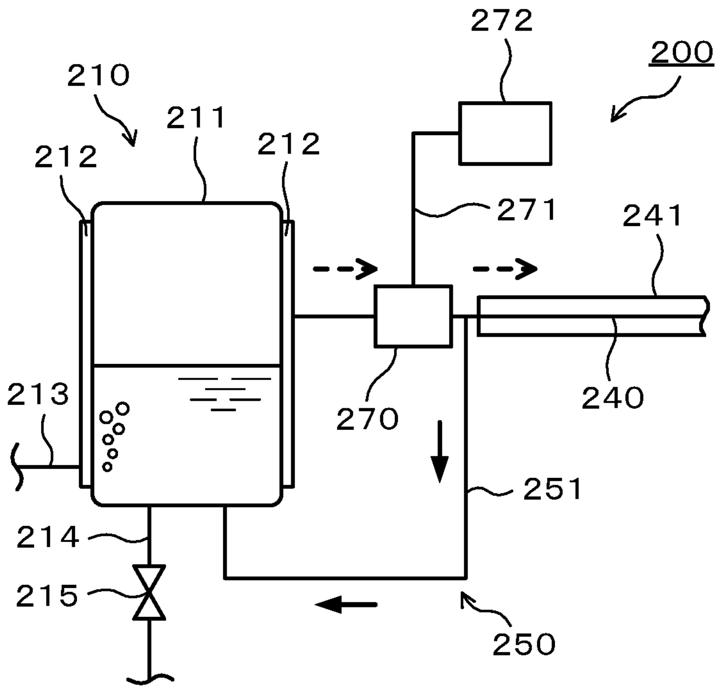
FIG. 8 is an explanatory view illustrating another configuration example of the solvent vapor supply apparatus.

A solvent vapor supply apparatus 200 illustrated in FIG. 8 includes a dilution chamber 270 which dilutes the solvent vapor generated in the first tank 211 with a nitrogen gas. To the dilution chamber 270, a gas supply pipe 271 which supplies the nitrogen gas is connected. The gas supply pipe 271 is connected to a gas supply source 272 of the nitrogen gas. Note that the gas supplied for dilution of the solvent vapor is not limited to the nitrogen gas but may be another inert gas such as an argon gas or a helium gas.

In this solvent vapor supply apparatus 200 in this configuration, the solvent vapor is diluted with the nitrogen gas so that the temperature of the solvent vapor becomes the target temperature of the solvent vapor to be supplied to the heating apparatus 100. This can set the concentration of the solvent vapor to the target concentration.

According to the solvent vapor supply apparatuses 200 explained in the above configuration examples, the temperature and concentration of the solvent vapor can be regulated to desired values without performing direct heating control of the solvent in the tank nor the concentration control of the solvent vapor by the pressure control which lead to complication and an increase in price of the apparatus configuration. In other words, even if the temperature of the solvent varies due to the vaporization heat at the time of generation of the solvent vapor, the temperature and concentration of the solvent vapor can be regulated to desired values with an inexpensive apparatus configuration. In short, according to the solvent vapor supply apparatuses 200, the concentration and temperature of the solvent vapor to be supplied to the heating apparatus 100 can be stabilized with an inexpensive apparatus configuration.

Note that the solvent vapor supply apparatus according to this disclosure is also applicable to an apparatus which supplies the solvent vapor to a substrate treatment apparatus of a treatment object substrate other than the semiconductor wafer, such as an FPD (Flat Panel Display) substrate.

According to this disclosure, it is possible to stabilize the temperature and concentration of solvent vapor to be supplied to a substrate treatment apparatus by a solvent vapor supply apparatus with an inexpensive configuration.

The embodiments disclosed herein are examples in all respects and should not be considered to be restrictive. Various omissions, substitutions and changes may be made in the embodiments without departing from the scope and spirit of the attached claims.

What is claimed is:

1. A solvent vapor supply apparatus for supplying solvent vapor to a substrate treatment apparatus, the solvent vapor supply apparatus comprising:

a solvent storage configured to be kept warm at a temperature equal to or higher than a saturation temperature of a solvent stored therein;

a precooler configured to precool the solvent vapor generated in the solvent storage; and a temperature regulator configured to regulate a temperature of the precooled solvent vapor to a target temperature when the solvent vapor is supplied to the substrate treatment apparatus, wherein the solvent storage has a heater which heats the solvent, the temperature regulator has a cooler which cools the solvent vapor, and the temperature regulator is configured to supply the solvent vapor regulated to the target temperature to the substrate treatment apparatus.

2. The solvent vapor supply apparatus according to claim 1, wherein:

the precooler is a pipe through which the solvent vapor generated in the solvent storage flows; and the pipe is connected to the solvent storage and the temperature regulator.

3. The solvent vapor supply apparatus according to claim 1, wherein:

the precooler has a tank into which the solvent vapor generated in the solvent storage flows;

pipes serving as flow paths for the solvent vapor are provided between the solvent storage and the precooler and between the precooler and the temperature regulator; and each of the pipes is covered with a heat insulating material.

4. The solvent vapor supply apparatus according to claim 1, wherein:

the solvent storage, the precooler, and the temperature regulator are provided in one container; and the precooler is provided above the solvent storage, and the temperature regulator is provided above the precooler.

5. The solvent vapor supply apparatus according to claim 1, further comprising a solution sending mechanism configured to send a solvent generated by condensation of part of the solvent vapor generated in the solvent storage, to the solvent storage.

6. The solvent vapor supply apparatus according to claim 2, further comprising a solution sending mechanism configured to send a solvent generated by condensation of part of the solvent vapor generated in the solvent storage, to the solvent storage.

7. The solvent vapor supply apparatus according to claim 3, further comprising a solution sending mechanism configured to send a solvent generated by condensation of part of the solvent vapor generated in the solvent storage, to the solvent storage.

8. The solvent vapor supply apparatus according to claim 1, wherein the substrate treatment apparatus is configured to heat a substrate on which a film of a block copolymer containing at least two polymers is formed, under an atmosphere of the solvent vapor, to phase-separate the block copolymer.

9. A solvent vapor supply method of supplying solvent vapor to a substrate treatment apparatus, the solvent vapor supply method comprising:

generating the solvent vapor by heating a solvent with a heater provided in a solvent storage;

precooling the solvent vapor generated in the generating the solvent vapor; and regulating a temperature of the solvent vapor, by cooling the precooled solvent vapor with a cooler provided in a temperature regulator, to a target temperature when supplying the solvent vapor to the substrate treatment apparatus, and supplying the solvent vapor regulated to the target temperature to the substrate treatment apparatus.

10. The solvent vapor supply method according to claim 9, wherein in the supplying the solvent vapor to the substrate treatment apparatus, the solvent vapor is supplied to a substrate treatment apparatus configured to heat a substrate on which a film of a block copolymer containing at least two polymers is formed, under an atmosphere of the solvent vapor, to phase-separate the block copolymer.

11. The solvent vapor supply apparatus according to claim 1, wherein a temperature of the solvent storage is at least 40° C.

12. The solvent vapor supply apparatus according to claim 1, wherein the cooler includes a Peltier element.

13. The solvent vapor supply apparatus according to claim 1, wherein the precooler has a tank into which the solvent vapor generated in the solvent storage flows;

further comprising a steam supply pipe connected to the tank, that supplies the solvent vapor to the substrate treatment apparatus.

14. The solvent vapor supply method according to claim 9, wherein a temperature of the solvent storage is at least 40° C.

15. The solvent vapor supply method according to claim 9, wherein the cooler includes a Peltier element.

* * * * *